United States Patent
Klenk et al.

(10) Patent No.: US 6,486,587 B2
(45) Date of Patent: Nov. 26, 2002

(54) DEVICE FOR CONTROLLING A PIEZOELEMENT INJECTION VALVE

(75) Inventors: Rolf Klenk, Stuttgart (DE); Klaus Rössler, Altbach (DE); Alexander Stefani, Bittenfeld (DE); Guido Vent, Oppenweiler (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/917,335

(22) Filed: Jul. 27, 2001

(65) Prior Publication Data

US 2002/0011762 A1 Jan. 31, 2002

Related U.S. Application Data

(63) Continuation-in-part of application No. PCT/EP99/09014, filed on Nov. 23, 1999.

(51) Int. Cl.$^7$ ................................................ H01L 41/04
(52) U.S. Cl. .................................................. 310/316.03
(58) Field of Search .......................... 310/316.03, 317; 123/498

(56) References Cited

U.S. PATENT DOCUMENTS

| | | | | |
|---|---|---|---|---|
| 3,589,345 A | * | 6/1971 | Benson | 123/478 |
| 4,376,255 A | * | 3/1983 | Kleinschmidt | 310/316.01 |
| 4,384,230 A | * | 5/1983 | Wisner | 310/317 |
| 4,529,164 A | | 7/1985 | Igashira et al. | |
| 4,644,212 A | | 2/1987 | Moritugu et al. | 310/317 |
| 4,732,129 A | * | 3/1988 | Takigawa et al. | 123/478 |
| 4,767,959 A | * | 8/1988 | Sakakibara et al. | 123/478 |
| 4,784,102 A | * | 11/1988 | Igashira et al. | 123/446 |
| 5,036,263 A | * | 7/1991 | Yamada et al. | 310/316.03 |
| 6,147,433 A | * | 11/2000 | Reineke et al. | 310/316.03 |
| 6,253,736 B1 | * | 7/2001 | Crofts et al. | 123/467 |
| 2002/0017280 A1 | * | 2/2002 | Rueger et al. | 123/498 |
| 2002/0046734 A1 | * | 4/2002 | Rueger | 123/446 |

FOREIGN PATENT DOCUMENTS

| | | | | |
|---|---|---|---|---|
| DE | 197 14 610 | | 10/1998 | |
| DE | 198 14 594 | | 10/1999 | |
| DE | 10034498 A1 | * | 1/2002 | F02D/41/06 |
| EP | 0 790 402 | | 8/1997 | |
| EP | 1167745 A1 | * | 2/2002 | F02M/45/08 |

* cited by examiner

Primary Examiner—Nestor Ramirez
Assistant Examiner—Peter Medley
(74) Attorney, Agent, or Firm—Klaus J. Bach

(57) ABSTRACT

In a device for controlling an injection valve which can be operated by a piezo-actuator and which comprises a charging and discharging circuit for the controlled charging of the piezo-actuator to a certain piezo-voltage, the charging and discharging circuit includes a power supply with a multitude of voltage levels which correspond to various valve opening positions and a switching device for the controlled switchover between the plurality of voltage levels.

4 Claims, 3 Drawing Sheets

DEVICE FOR CONTROLLING A PIEZOELEMENT INJECTION VALVE

This is a Continuation-In-Part application of international application PCT/EP99/09014 filed Nov. 23, 1999 and claiming the priority of German application 199 03 555.5 filed Jan. 29, 1999.

BACKGROUND OF THE INVENTION

The invention relates to a device for operating an injection valve which can be activated by means of a piezo-actuator, in particular for a spark ignition engine with internal mixture formation, having charging means and discharging means for the controlled charging and discharging of the piezo-actuator to a respectively desired piezo-voltage.

In internal combustion engines with direct fuel injection, the fuel consumption and the emission of pollutants can be optimized by operating injection valves in a defined way during the injection process wherein the injection beam characteristic, such as for example, the opening angle of the beam, the thickness of the beam, the direction of the beam and in particular also the degree of fuel atomization are set in a defined way over the opening stroke of the injection valves. In particular, piezo-actuators, which permit an electrical signal to be converted virtually without delay into a mechanical movement, are suitable for driving injection valves with an adjustable opening stroke. This movement can be controlled precisely in terms of deflection and time profile by adjusting the voltage, which is applied to the piezo-actuator. In this way, injections which are configured in virtually any desired way can be achieved, for example, injections with an opening stroke which decreases continuously between two different opening settings, as disclosed in DR 196 42 653 C1.

An injection valve which is suitable in particular also for use in internal combustion engines with a common rail injection system and which has a piezo-actuator is described, for example, in DE 195 48 526 A1 and in the periodical article M. Rumphorst, "Ein neues elektronisches Hochdruck-Einspritzsystem für Dieselmotoren (A new electronic high pressure injection system for Diesel engines)", MTZ Motortechnische Zeitschrift [Motor technology periodical] 56 (1995) 3, page 142. Whereas the valve opens in the system described in DE 195 48 526 A1, when the piezo-voltage is applied, the application of voltage in the system of the aforementioned periodical leads to the valve closing. Here, the discharging process for the piezo-actuator can take place at different voltage levels in order to obtain different opening settings for the valve in this way. The discharging process preferably takes place with a constant discharge flow.

A device for actuating an injection valve which can be operated by means of a piezo-actuator and which corresponds to the type mentioned at the beginning is disclosed in U.S. Pat. No. 5,130,598. In this publication, in order to connect the piezo-actuator in a controllable fashion to a high voltage source and disconnect it therefrom, the voltage applied to the piezo-actuator is compared with a reference voltage representing the desired piezo-voltage. A comparator output signal is used, together with the output signal of an electronic control device, which takes into account engine operating parameters, to actuate a gate circuit in the power path of the high voltage supply for the piezo-actuator. The discharge means make available a high voltage, which corresponds preferably to the maximum desired piezo-voltage, while the discharge potential of the discharge means is preferably at zero potential.

EP 0 460 660 A2 discloses a further device for actuating a piezo-drive for an injection valve, in which the injection valve is closed by applying a high voltage. By monitoring the timing of the discharging of the piezo-actuator to a reference voltage potential, the piezo-voltage, and thus the valve opening stroke, can be continuously set at a specific range.

It is the object of the present invention to provide a device for actuating an injection valve which can be operated by means of a piezo-actuator and which permits specific types of actuation to be implemented with relatively little expenditure and a high degree of reliability.

SUMMARY OF THE INVENTION

In a device for controlling an injection valve which can be operated by a piezo-actuator and which comprises a charging and discharging circuit for the controlled charging of the piezo-actuator to a certain piezo-voltage, the charging and discharging circuit includes a power supply with a multitude of voltage levels which correspond to various valve opening positions and a switching device for the controlled switch-over between the plurality of voltage levels.

In one embodiment of the invention, the voltage supply makes available at least three different voltage levels at corresponding terminals between which it is possible to switch over directly in order to provide for different valve opening settings, with the result that a plurality of required valve settings can be set reliably without additional outlay in control.

In another embodiment, time-controlled charging or discharging voltage levels are applied to the piezo-actuator, wherefor only one voltage source is required and with which any desired voltage valve stroke profile can be realized. The charging voltage level is selected to be higher than the maximum desired piezo-voltage, and/or the discharging voltage level is selected to be lower than the minimum desired piezo-voltage. In this way, rapid charging or discharging to a maximum or minimum desired piezo-voltage level is made possible. The time-controlled switching means may permit the potential difference applied to the piezo-actuator to be inverted. This makes it possible to use a voltage source, which only makes available two different voltages.

Preferably, the charging and discharging means have current control means for respectively setting a constant charging or discharging current, the value of the controlled, constant charging current being selected to be equal to the value of the maximum uncontrolled charging current at the maximum piezo-voltage level. This permits the piezo-element to be charged in a non-damaging way.

In a particularly advantageous embodiment of the invention, the charging and discharging means have monitoring means for monitoring the voltage applied to the piezo-actuator and/or the zero position of the piezo-actuator and time setting means, which define the control times for the time controlled switching means as a function of the monitoring function of the monitoring means. This permits the voltage levels to be adjusted adaptively, for example, as a function of fluctuations in the properties of various injection valves and as a function of valve aging phenomena.

Advantageous embodiments of the invention will be described below in greater detail on the basis of the accompanying drawings:

DESCRIPTION OF PREFERRED EMBODIMENTS

Figure 1:
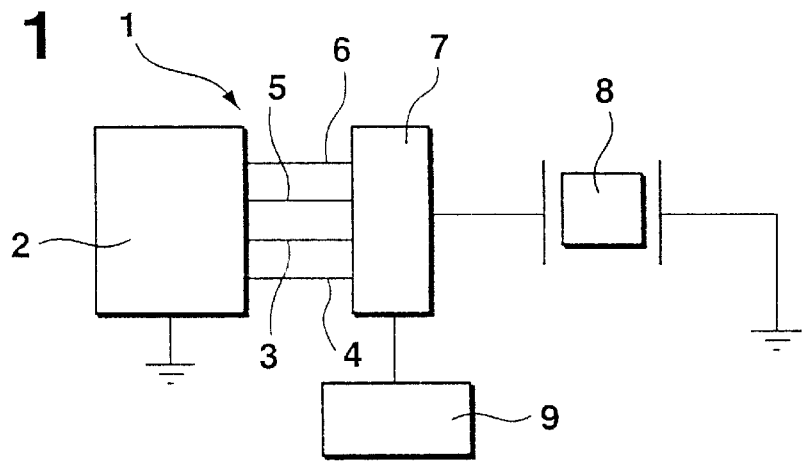
FIG. 1 shows a block diagram of a device for operating an injection valve, which can be operated by means of a piezo-actuator, FIG. 2 a piezo-voltage/time diagram explaining the operation of the device shown in FIG. 1.

The device 1 illustrated in FIG. 1 for operating an injection valve which can be operated by means of a piezo-actuator 8 includes a high voltage source 2 which makes available four different voltage levels at terminals 3, 4, 5, and 6, specifically 0 V at terminal 3, that is to say ground, 50 V at terminal 4, 100 V at terminal 5 and 200 V at terminal 6. By means of a switch-over control unit 7, the terminals 3 to 6 are connected to the piezo-actuator 8 which is part of an injection valve (not shown). The switch-over control unit 7 is connected, via a signal line, to an engine controller 9, which supplies to the switch-over control unit 7 the information indicating the time period for which a specific valve opening setting should be effective at the injection valve by means of the piezo-actuator 8. On the basis of the control signal of the engine controller, the switch-over control unit 7 then establishes a connection of the piezo-actuator 8 to one of the terminals 3 to 6 of the high voltage source 2. A plurality of injection valves of a multi-cylinder internal combustion engine can be connected to each of the terminals 3 to 6 of the high voltage source 2 via one switch-over control unit.

Figure 2:
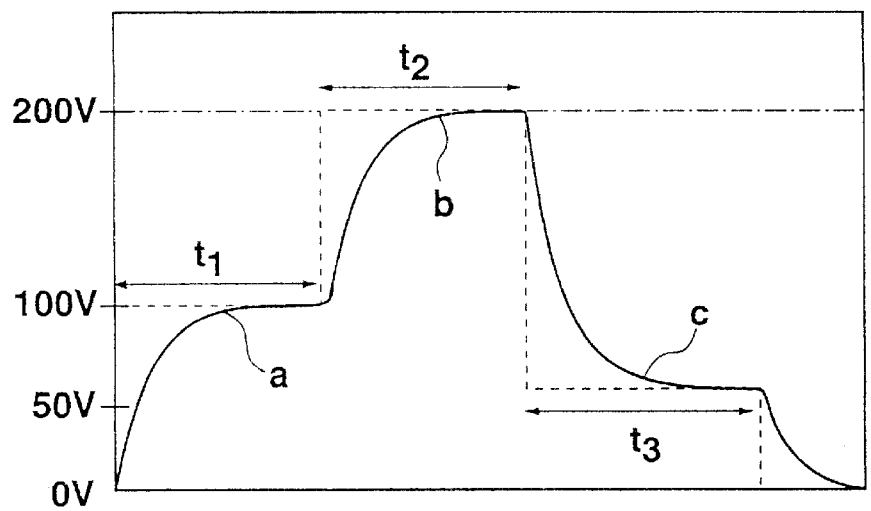

FIG. 2 shows the time profile of an exemplary injection process of an injection valve which is driven by means of the piezo-actuator 8 and which is essentially carried out with three different valve strokes. In FIG. 2, a desired, ideal profile of the voltage at the piezo-actuator 8 is indicated by dotted lines, and the real voltage profile which is implemented technically at the piezo-actuator 8 is represented as a function of time by the continuous line. If a voltage of 0 V is applied to the piezo-actuator 8, the injection valve is in its closed position. On the basis of the signal from the engine controller 9, the switch-over control unit 7 first applies a voltage level of +100 V to the piezo-actuator 8 for a time $t_1$, which corresponds to a medium opening setting a of the injection valve, in order to perform a pre-injection of fuel into a cylinder of the engine. The piezo-actuator 8 is thus energized or charged along an energizing curve with an exponential profile. After the time $t_1$ has elapsed, the piezo-actuator 8 is connected to the terminal 6 of the high voltage source 2, which is at +200 V as triggered by the engine controller 9. The piezo-actuator 8 then remains energized and the injection valve fully opens for a time interval $t_2$ with a main injection stroke to a main injection setting b in which injection with a maximum throughput of fuel takes place. In order then to obtain at a final injection setting c for a time interval $t_3$, the engine controller 9 causes the voltage level 4 of 50 V to be applied to the piezo-actuator 8 by the switch-over control unit 7. This results in an exponential drop in the voltage at the piezo-actuator 8. As a result of the voltage level "0 V" of terminal 3 being applied, the injection valve is then closed and the injection process is thus terminated. Then, the fuel mixture in the associated cylinder space of the internal combustion engine is ignited. The injection valve then remains in a closed state until the engine controller 9 triggers a new injection process for a new working cycle by actuating the switch-over control unit 7.

Figure 3:
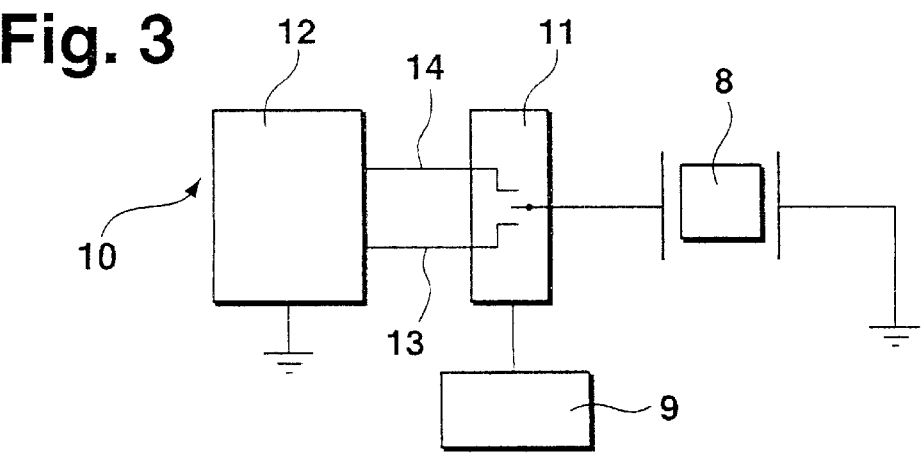
FIG. 3 shows a block diagram of a further device for actuating an injection valve, which can be activated by means of a piezo-actuator.

FIG. 3 illustrates a further device for actuating an injection valve, which can be activated by means of a piezo-actuator 8. This device includes a time-controlled switch-over control unit 11 which is connected to a high voltage source 12 which, in contrast to the example in FIG. 1, makes a voltage of −120 V or +320 V available at only two terminals 13, 14. As in the example in FIG. 1, there is an engine control unit 9, which provides the switch-over control unit 11, via a signal line, with the information indicating for which time period a specific opening setting for the injection valve is to be aimed at. The voltage is set at the piezo-actuator 8 by the charging voltage level of terminal 14 or the discharging voltage level 13 of the high voltage source 12 being applied with controlled timing to the piezo-actuator 8 by means of the switch-over control valve 11 for precisely the time which is necessary for the desired opening setting of the injection valve. To do this, the switch-over control unit 11 uses desirable charging and discharging curves stored in it to assign to the voltage at the piezo-actuator 8, and a time period for which it establishes a connection of the piezo-actuator 8 to one of the terminals 13 or 14 of the high voltage source 12. Instead of storing suitable charging and discharging curves in the switch-over control unit 11, it is also possible to calculate on an updated basis, by means of the respective starting conditions, the energizing or de-energizing times necessary for obtaining the desired voltage at the piezo-actuator 8.

In order to energize the piezo-actuator 8 to the respectively necessary voltage for different opening settings of the injection valve in a way which is virtually linear over time, the positive terminal voltage at the terminal 14 of the high voltage source 12 is, with +320 V, significantly higher than the maximum necessary voltage of +200 V at the piezo-actuator 8. The piezo-actuator 8 is discharged in a corresponding linear way over time by virtue of the fact that the negative discharge voltage of −120 V is significantly below the minimum voltage at the piezo-actuator 8 of 0 V. The charging voltage which is higher in the present example by the factor 1.57 in comparison with the maximum piezo-voltage also results in the respective energizing step being terminated at the latest after an energizing time corresponding to the time constant of the exponential charge curve profile. The same applies to the de-energization, that is the discharging.

Figure 4:
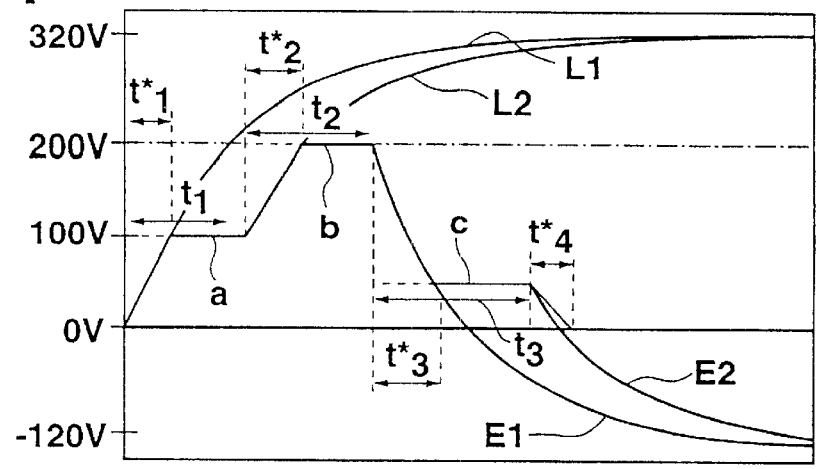
FIG. 4 shows a piezo-voltage/time diagram explaining the operation of the device shown in FIG. 3.

FIG. 4 shows the time profile of the voltage at the piezo-actuator 8 during an injection process, which is controlled with the device shown in FIG. 3. As in the case of the process explained in FIG. 2, by way of example three valve opening settings a, b and c are provided by an injection valve to which the piezo-actuator 8 is assigned. The continuous line is the voltage at the piezo-actuator 8 as a function of time. The ideal voltage profile for the piezo-actuator 8 is represented by dashed lines. A dot-dashed line indicates, as in FIG. 2, a maximum voltage level for the piezo-actuator 8. In each case, two further curves L1, L2 and E1, E2 represent the time profile of energizing and de-energizing curves with exponential profiles, such as are obtained for the piezo-actuator 8 as long as the latter is connected to the energizing or de-energizing terminal 13, 14, respectively.

In order to move the injection valve out of its closed position into an open position a, the voltage level +320 V is applied by means of the switch-over control device 11 for the time period $t_1^+$ indicated in FIG. 4. The piezo-actuator 8 is energized in accordance with the energizing curve L1 and causes the valve stroke of the injection valve to rise again. After the time period $t_1^+$, the voltage at the piezo-actuator 8 has risen to 100 V, and the energizing process is terminated with controlled timing in order to subsequently keep the piezo-voltage at this value for a desired time period $t_1-t_1^+$. In order to move the injection valve to the main injection position b, the voltage level of +320 V is again applied, specifically for a time period $t_2^+$, which is necessary to allow the voltage at the piezo-actuator 8 to rise to 200 V in accordance with the charging curve L2, after which it is kept there for a desired time period $t_2-t_2^+$. By applying a negative voltage level of −120 V to the terminal 13 of the high voltage source 12 for a time period $t_3^+$, a reduced valve opening is set in accordance with the discharging curve E1, the reduced valve opening being maintained for a time period $t_3-t_3^+$ until the engine controller 9 signals to the switch-over control unit 11 that the injection valve is to be moved into a closed position by the piezo-actuator 8. This is then brought about by again applying the voltage level of −120 V for a time period $t_4^+$ in accordance with the discharging curve E2. The injection cycle is thus terminated and then begins again under corresponding control by the engine controller 9.

Figure 5:
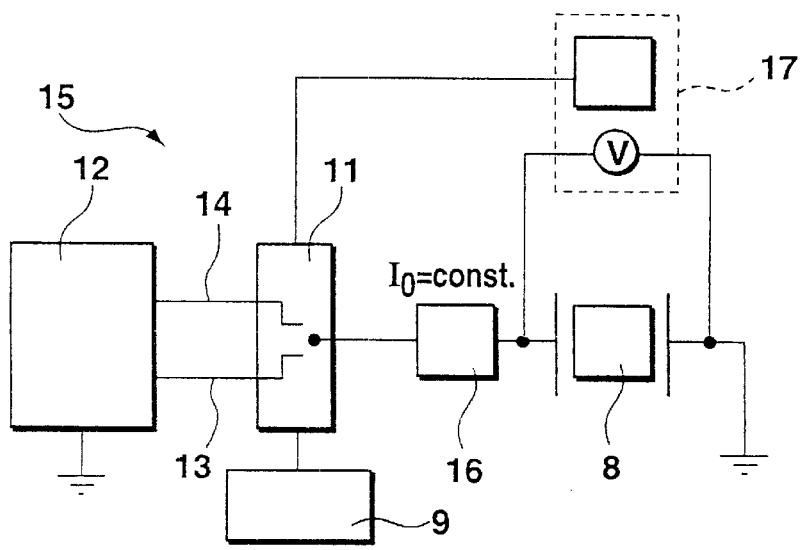
FIG. 5 shows a block diagram of a further device for operating an injection valve, which can be operated by means of a piezo-actuator.

FIG. 5 shows another exemplary embodiment of a device 15 for actuating a piezo-element injection valve. As in the example shown in FIG. 3, in order to energize a piezo-actuator 8, a high-voltage source 12 is provided which makes available a voltage of −120 V or +320 V at terminals 13, 14. The piezo-actuator 8 is again connected to the high voltage source 12 by a switch-over control unit 11. However, in contrast to the exemplary embodiment shown in FIG. 3, a constant current regulator 16 is arranged in the path between the switch-over control unit 11 and the piezo-actuator 8. The constant control regulator 16 causes a charging current $I_0$ which is constant over time always to flow to or from the piezo-actuator 8, which brings about energizing or de-energizing of the same linearly over time. In addition, in the device 15 a voltage monitoring unit 17 with A/D converter for the piezo-actuator 8 is provided which monitors the voltage set under time control at the piezo-actuator 8 by means of the switch-over control unit 11 as in the example in FIG. 3 and makes available a correction signal to the switch-over control unit 11. The voltage monitoring unit 17 makes it possible to correct the charging and discharging time calculation, which can become imprecise when there are fluctuations in the operating parameters of the injection valve, such as the capacitance of the piezo-actuator 8, because of aging or because of parameter variations between different valves.

Figure 6:
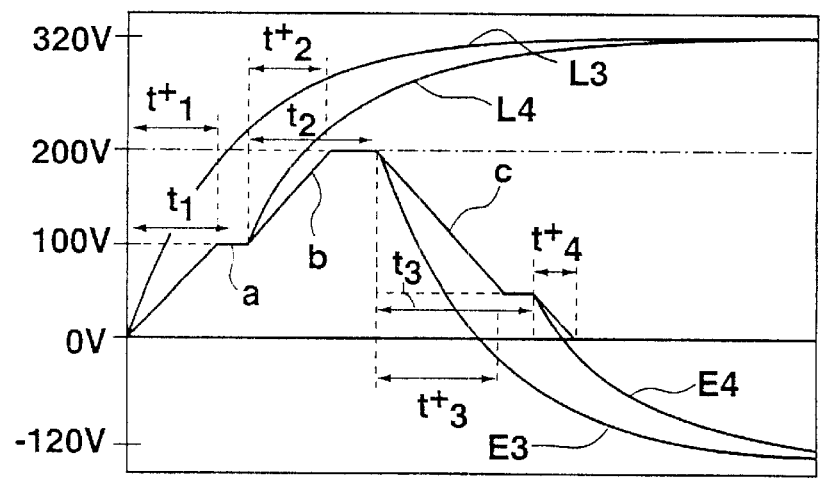
FIG. 6 shows a piezo-voltage/time diagram explaining the operation of the device shown in FIG. 5.

FIG. 6 shows the profile of the voltage at the piezo-actuator 8 over time in order to control the stroke of an injection valve in an injection process, again between a closed setting, the medium opening setting a, in which a pre-injection is performed, a main injection setting b, in which the injection valve is opened with a main injection stroke, and a terminating injection setting c.

FIG. 6 shows the voltage at the piezo-actuator 8 with the characteristic curve, which is represented by an unbroken line, and an ideal voltage profile represented by a dotted line. A dot-dashed line characterizes, as in FIGS. 4 and 6, a maximum voltage level for the piezo-actuator 8. In addition, in each case two energizing and de-energizing curves L3, L4 and E3, E4 represent the time profile of the charging and discharging voltage without constant current regulation. In order to move the injection valve into the medium opening position a, the piezo-actuator 8 is energized under time control for a time period of the length $t_1^+$ with a constant energizing current, the energizing being carried out via the terminal 14 of the high voltage source 12 where a positive high voltage is made available. After the time period $t_1$ has elapsed, the engine controller 9 commands the switch-over control unit 11 to set the main injection setting b of the injection valve, after which the piezo-actuator 8 is energized to the necessary voltage again with a constant energizing current for the time period $t_2^+$. As soon as the voltage has been reached, the energizing process is aborted, as in section a. The piezo-actuator 8 is de-energized in a corresponding way in order to bring about the final injection setting c, the discharging current flowing to the terminal 13 of the high voltage source 12 at which a negative voltage of −120 V is applied. After the time interval $t_3$ has elapsed, the engine controller 9 signals to the switch-over control unit 11 that the injection valve is to be moved into a closed position, and the switch-over control unit 11 then causes the piezo-actuator 8 to be de-energized with a constant de-energizing current. For this purpose, the piezo-actuator 8 is again connected to the negative potential of the terminal 13 of the high voltage source 12 for a time interval $t_4^+$. The injection cycle is thus terminated and then begins again under corresponding control by the engine controller 9. The constant energizing current intensity $I_0$ is selected to be as large as possible in order to achieve short reaction times. It preferably corresponds to the maximum energizing current intensity with the maximum piezo-voltage in the case of an uncontrolled energizing process, i.e. the energizing current intensity, which is obtained for the energizing curve L3 with the maximum piezo-voltage of +220 V. The de-energizing current intensity is preferably selected to be of the same magnitude.

Figure 7:
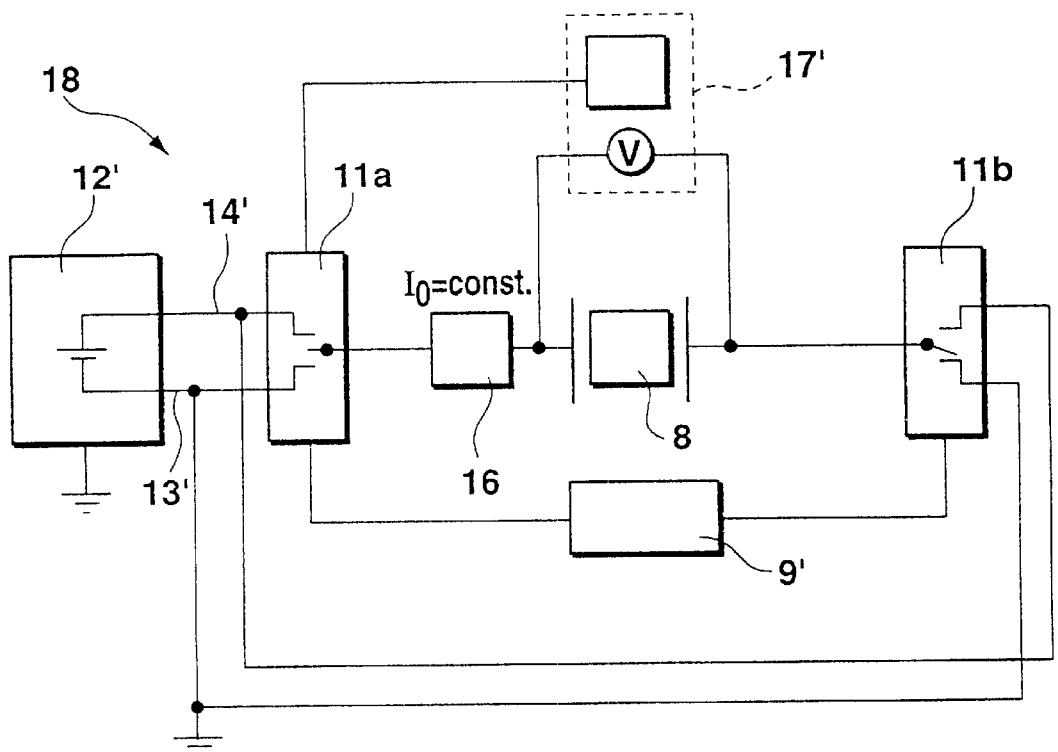
FIG. 7 shows a block diagram of a further device for operating an injection valve which can be operated by means of a piezo-actuator.

FIG. 7 shows a device 18 for actuating a piezo-element injection valve using a full bridge switching arrangement as a further exemplary embodiment. In order to charge the piezo-actuator 8, in this case a high voltage source 12' is provided which, including ground, makes available only two supply voltages at associated terminals 13', 14', specifically voltages of 0 V and +320 V. The piezo-actuator 8 is connected to the high voltage source 12' via a full bridge composed of two switching units 11a, 11b. In the path between the one switching unit 11a and the piezo-actuator 8, a constant current regulator 16 is arranged, which causes an energizing or de-energizing current $I_0$ which is constant over time to flow to or from the piezo-actuator 8, which brings about energizing or de-energizing of the same linearly over time. In addition, a voltage monitoring unit 17' with A/D converter for the piezo-actuator 8 is provided, which monitors the voltage at the piezo-actuator 8. The voltage monitoring unit 17' again makes it possible to correct the charging and discharging time calculation, which can become imprecise when there are fluctuations in the operating parameters of the injection valve, such as the capacitance of the piezo-actuator 8, because, for example, of aging or of parameter variations between different valves.

Figure 8:
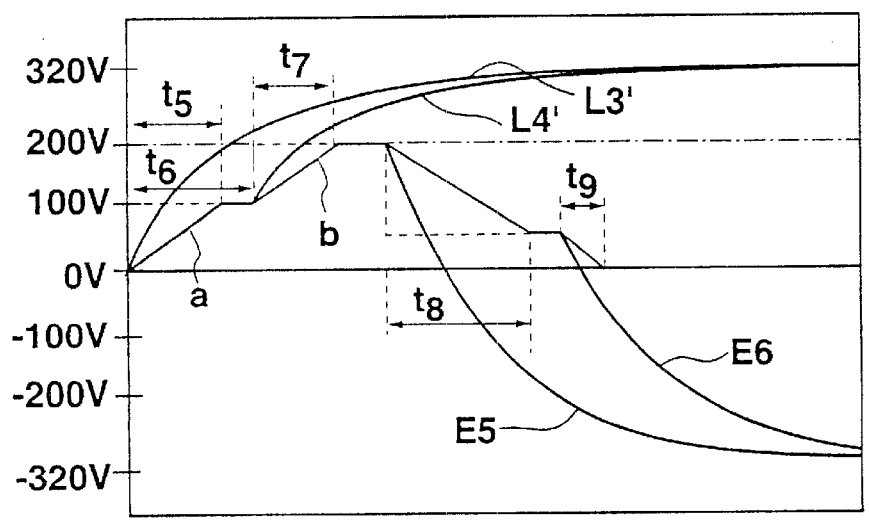
FIG. 8 shows a piezo-voltage/time diagram explaining the operation of the device shown in FIG. 7.

FIG. 8 shows the operation of the device of FIG. 7 by reference to the time profile of the voltage of the piezo-actuator 8 in order to control the stroke of an injection valve in an injection process, again between a closed setting, an intermediate opening setting a, in which a pre-injection is performed, a main injection setting b, in which the injection valve is opened with the main injection stroke, and a terminating injection setting c.

FIG. 8 shows the voltage at the piezo-actuator 8 with the characteristic curve illustrated by a continuous line, and an ideal voltage profile represented by a dotted line. A dot-dashed line characterizes, as in FIGS. 2, 4 and 6, a maximum voltage level for the piezo-actuator 8. In addition, in each case two energizing and de-energizing curves L3', L4' and E5, E6 represent the time profile of the energizing current or de-energizing current without constant current regulation. In order to move the injection valve into the intermediate opening position a, the piezo-actuator 8 is energized under time control for a time interval of the length $t_5$ with a constant energizing current. A terminal of the piezo-actuator 8 is connected to the terminal 14' of the high voltage source 12' by means of the switching unit 11a, the positive high voltage of +320 V being made available at the terminal 14'. The other terminal of the piezo-actuator 8 is connected to 0 V by the switching unit 11b. After the time period $t_6$ has elapsed, the engine controller 9' commands the switching units 11a, 11b to set the main injection setting b of the injection valve, after which the piezo-actuator 8 is again energized to the necessary voltage with a constant energizing current for the time period $t_7$. As soon as the voltage is reached, the energizing process is aborted, as in section a.

In order to de-energize the piezo-actuator 8 in order to bring about the final injection setting c, in a way which is inverse with respect to the previous energizing steps, the one terminal of the piezo-actuator 8 is connected to +320 V via the switching unit 11b for a specific time period $t_8$, and the other terminal is connected to ground by means of the switching unit 11a, with the result that a reversed potential difference is applied to the piezo-actuator 8 in comparison to the energizing process. After the time interval $t_8$ has elapsed, the engine controller 9' signals to the switching units 11a, 11b that the injection valve is to be moved into a closed setting. For this purpose, a terminal of the piezo-actuator 8 is again connected to 320 V by means of the switching unit 11b, and the other terminal is connected to ground for a time interval $t_9$, with the result that the piezo-actuator 8 is completely de-energized with a constant discharging current. The complete discharge state of the piezo-actuator 8 is detected by means of a voltage zero crossing detection by the voltage monitoring unit 17'. In this way, the injection cycle is terminated and then begins again under corresponding control by the engine controller 9'. The constant charging current intensity $I_0$ is selected to be as large as possible in order to achieve short reaction times. It preferably corresponds to the maximum charging current intensity at the maximum piezo-voltage in the case of an uncontrolled charging process, i.e. the charging current intensity which is obtained for the charging curve L3' at the maximum piezo-voltage of +320 V. The discharging current intensity is preferably selected to be of the same magnitude.

The device in FIG. 7 has the advantage that it requires only two output voltages, including ground, the potential difference being applied to the piezo-actuator either in one direction or the other. By virtue of the constant current regulation, symmetrical charging and discharging processes are obtained despite asymmetrical charging and discharging voltages.

The voltages monitoring units 17, 17' in the devices illustrated in FIGS. 5 and 7 make possible reliable, maintenance-free operation of the injection valve even over long time periods. Of course, it is also possible to provide a corresponding voltage monitoring unit in the device illustrated in FIG. 3, as a result of which an improvement in the long time stability of the valve actuation is also obtained here.

The three exemplary embodiments with time-controlled charging and discharging of the piezo-actuator require only one valve-opening supply voltage level, make possible charging and discharging processes with steep rising and falling edges and permit virtually any desired valve needle stroke profiles. The constant current regulation provides the way of charging and discharging the piezo-actuator, which is particularly non-damaging.

What is claimed is:

1. A device for controlling an injection valve, which can be activated by means of a piezo-actuator, in particular for a spark ignition engine with internal air/fuel mixture formation, having charging and discharging means for the controlled charging and discharging of said piezo-actuator to a desired charging and, respectively, discharging piezo-voltage, said charging and discharging means including a voltage supply with a time-controlled switching means providing an initial charging voltage level and an initial discharging voltage level, said initial charging voltage level being higher than the desired charging piezo-voltage and the initial discharging voltage level being lower than the desired discharging piezo-voltage level, and time-controlled switching means for a rapid time-controlled establishment of the desired piezo-voltage in the piezo-actuator.

2. A device according to claim 1, wherein said time-controlled switching means has a switching arrangement, which arrangement connects a first terminal of the piezo-actuator either to a first or to a second of two different voltage outputs of the voltage supply and a second terminal of the piezo-actuator to the respective other voltage output of the voltage supply.

3. A device according to claim 1, wherein the charging and discharging means include current control means for, respectively, setting a constant charging and discharging current intensity, the constant current intensity value being selected to be equal to the maximum uncontrolled charging current intensity value at the maximum desired piezo-voltage value.

4. A device according to claim 1, wherein the charging and discharging means have monitoring means for monitoring the voltage applied to the piezo-actuator and the zero position of the piezo-actuator and time setting means which define the control times for the time-controlled switching means as a function of the monitoring information of the monitoring means.

* * * * *